(12) United States Patent
Ziaei et al.

(10) Patent No.: US 7,898,772 B1
(45) Date of Patent: Mar. 1, 2011

(54) DISK DRIVE SUSPENSION WITH GIMBAL DESIGNED TO PROVIDE ENHANCED SIGNAL FIDELITY

(75) Inventors: Shahyar Ziaei, Danville, CA (US);
Peter Hahn, Temecula, CA (US)

(73) Assignee: Magnecomp Corporation, Murrieta, CA (US)

( * ) Notice: Subject to any disclaimer, the term of this patent is extended or adjusted under 35 U.S.C. 154(b) by 812 days.

(21) Appl. No.: 11/839,373

(22) Filed: Aug. 15, 2007

(51) Int. Cl.
*G11B 5/48* (2006.01)
*G11B 21/16* (2006.01)

(52) U.S. Cl. .................................. 360/245.8; 360/245
(58) Field of Classification Search .............. 360/244, 360/245, 245.4, 245.8, 245.9
See application file for complete search history.

(56) References Cited

U.S. PATENT DOCUMENTS

| | | | |
|---|---|---|---|
| 5,995,328 A | 11/1999 | Balakrishnan | |
| 6,146,813 A * | 11/2000 | Girard et al. | 430/319 |
| 6,249,404 B1 * | 6/2001 | Doundakov et al. | 360/245.4 |
| 6,515,832 B1 | 2/2003 | Girard | |
| 6,596,184 B1 | 7/2003 | Shum et al. | |
| 6,741,426 B2 * | 5/2004 | Girard | 360/245.4 |
| 2007/0115591 A1 | 5/2007 | Yao et al. | |
| 2008/0192384 A1 * | 8/2008 | Danielson et al. | 360/245.9 |

OTHER PUBLICATIONS

Lee W. Ritchey, 'Differential Signaling Doesn't Require Differential Impedance or, How to Design a Differential Signaling Circuit', Printed Circuit Design, Mar. 1999.

* cited by examiner

*Primary Examiner* — Craig A. Renner
*Assistant Examiner* — Gustavo Polo
(74) *Attorney, Agent, or Firm* — Intellectual Property Law Offices of Joel Voelzke, APC

(57) ABSTRACT

A gimbal, a disk drive suspension that includes the gimbal, and a related method of manufacture, wherein the gimbal is configured to be coupled to a slider having a disk drive read-write transducer. The gimbal includes one or more strut(s) having an insulating layer that includes a first surface, and a supporting layer that includes a plurality of segments and that is coupled to the insulating layer's first surface.

15 Claims, 8 Drawing Sheets

DISK DRIVE SUSPENSION WITH GIMBAL DESIGNED TO PROVIDE ENHANCED SIGNAL FIDELITY

FIELD OF THE INVENTION

The invention relates generally to the field of disk drive suspensions. More specifically, the invention relates to low-stiffness gimbals that provide enhanced signal fidelity and are configured to be included in disk drive suspensions and a related method of manufacture.

BACKGROUND

Figures 1, 2, 3, 4:
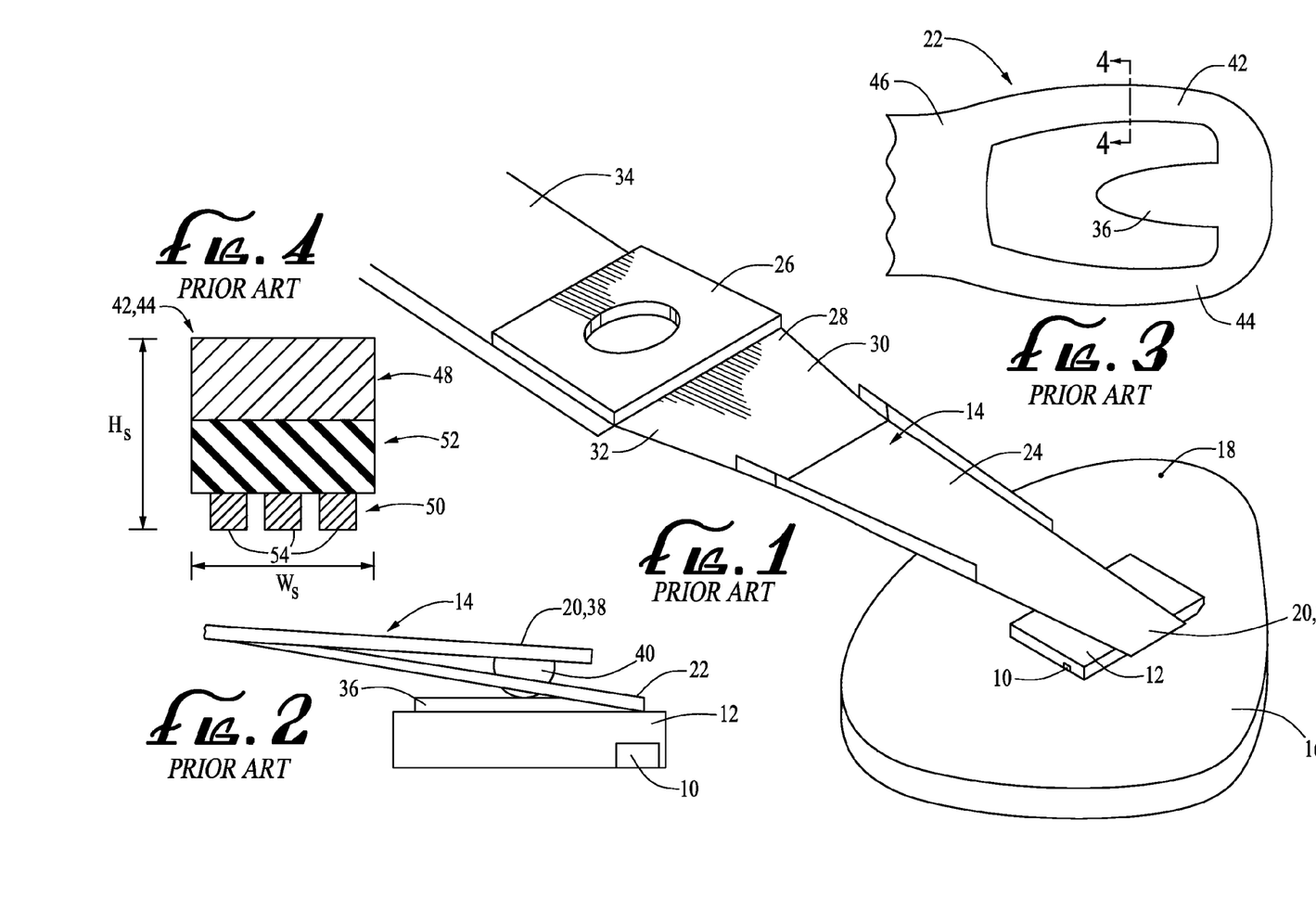
FIG. 1 is a perspective view of an example disk drive suspension and slider.
FIG. 2 is a partial side elevational view of a distal end of the example disk drive suspension and slider shown in FIG. 1.
FIG. 3 is a partial top plan view of an example gimbal that is included as part of the disk drive suspension shown in FIG. 1.
FIG. 4 is a sectional view of the gimbal shown in FIG. 3 along line 4-4.

Suspensions for suspending sliders in hard disk drives are well known in the art. Referring to FIG. 1, in a typical hard disk drive, the drive's read-write transducer 10 is included in, or mounted to, a slider 12, which has an aerodynamic design and is supported by a suspension 14. The slider's aerodynamic design allows for airflow between the slider and the disk drive's spinning disk 16. This airflow generates lift, which allows the read-write transducer to fly above the spinning disk's surface 18 at an optimal distance for reading data from, or writing data to, the disk. Referring additionally to FIG. 2, which is a partial side elevational view of the slider and a distal end 20 of the suspension, a typical suspension includes a gimbal 22 at the suspension's distal end, a load beam 24, and a baseplate 26 at the suspension's proximal end 28. The slider is bonded to the gimbal, which permits the slider to pitch and roll as it tracks fluctuations in the surface of the disk, and the gimbal is bonded to the load beam's distal end using, for example, a welding device, e.g., a spot welding device.

Typically, the load beam 24 is formed from stainless steel ("SST") foil and includes a spring portion 30 that applies a loading force, also known as a "pre-load" or "gram force," to the slider 12. The pre-load force counteracts the lift that is generated by the interaction between the slider and the spinning disk 16, and brings the slider into a predetermined close spacing to the disk surface 18 while the disk is spinning. A proximal end 32 of the load beam is coupled to the baseplate 26, which is configured to couple to an actuator arm 34. The actuator arm moves under motor control to precisely position the slider, and thus, the drive's read/write head 10 relative to the disk surface.

As shown in FIG. 2, the gimbal 22 supports the slider 12. In particular, the slider is coupled to a tongue-shaped part 36 of the gimbal. The distal end 38 of the load beam includes a hemispherical projection (also referred to as a dimple) 40 against which the tongue-shaped part of the gimbal rests. The gimbal in combination with the load beam's hemispherical projection allows the slider to pitch and roll in response to irregularities in the disk's surface 18.

Referring additionally to FIGS. 3 and 4, an example gimbal 22 is shown. FIG. 3 is a partial top plan view of the example gimbal, which includes two struts (also known as "outrigger struts") 42 and 44 that couple the gimbal's tongue-shaped part 36 to the gimbal's proximal end 46, which couples to the distal end 38 of the load beam 24. As shown in the sectional view of FIG. 4, the strut includes the following three layers: a supporting layer 48, a conducting layer 50, and an insulating layer 52, which is coupled between the supporting layer and the conducting layer. The supporting layer is configured to provide mechanical support for the insulating and conducting layers. Typically, the supporting layer is made of a supporting material, e.g., stainless steel ("SST"). The insulating layer (also referred to as a "dielectric layer") is made of an insulating material, e.g., polyimide. The conducting layer is made of a conducting material, e.g., copper or an alloy thereof, and formed into traces 54 that are configured to be coupled to electrical leads (not shown) that interface with the slider's read-write transducer 10. Overall, the strut, including all three layers, has a height "$H_S$" and a width "$W_S$."

The size of disk drive sliders 12 has decreased over time. As sliders have become smaller, the requirements for disk drive suspensions 14 have shifted to ever lower pitch and roll stiffness values because a smaller slider will exert a smaller torque on the disk drive suspension. Accordingly, the disk drive suspension's pitch and roll stiffness values must be lower so the slider is still able to maintain its pitch and roll within a specific range while the slider flies above the disk's surface 18 under a variety of conditions, e.g., vibration of the disk drive.

Various schemes have been developed to achieve suspensions 14 having low pitch and roll stiffness values. In one scheme, the height "$H_S$" and the width "$W_S$" of the gimbal's struts 42 and 44 are minimized by making the height and width of the individual layers, i.e., the supporting layer 48, the insulating layer 52, and the conducting layer 50, of each strut as small as possible. However, the dimensions of the layers cannot be reduced below the manufacturing capabilities of the equipment that is used to fabricate the layers. Accordingly, there are inherent limitations in the fabrication process that prevent the reduction of a disk drive suspension's pitch and roll stiffness values beyond a certain value.

In other schemes, the layers 48-52 that make up the gimbal's struts 42 and 44 are separated lateral to one another in an effort to reduce the high values of pitch and roll stiffness that occur when the layers are stacked vertically on top of one another, as shown in FIG. 4. A difficulty that is associated with this approach is that when the layers of the strut are dispersed laterally and are very thin, the layers are subject to vibrations due to impinging airflow from the spinning disk 16.

Another difficulty that is associated with gimbal's struts 42 and 44 having laterally separated layers 48-52 is that it is difficult to include a ground plane in these struts. In the past, due to concerns over the mechanical performance of gimbals 22, ground planes were not used in struts in an effort to keep pitch and roll stiffness values low. As disk drive data rates have increased over time, the inclusion of a ground plane in the gimbal has taken on importance because the ground plane advantageously offers reduce impedance discontinuity at the interface between the suspension 14 and the read-write transducer 10.

It should, therefore, be appreciated that there is a need for a disk drive suspension 14 that includes a gimbal 22 having a low value of pitch and roll stiffness, and that can be manufactured using currently available fabrication techniques without compromising vibrational and electrical performance. The present invention satisfies these needs.

SUMMARY

Embodiments of the present invention include a gimbal, a suspension that includes the gimbal, and a related method for manufacture, which offer low values of pitch and roll stiffness, enhanced electrical fidelity, and can be manufactured using currently available fabrication techniques. An exemplary embodiment of the invention is a gimbal that is configured to be coupled to a slider having a disk drive read-write transducer. The gimbal includes one or more strut(s) having an insulating layer that includes a first surface, and a supporting layer that includes a plurality of segments that is coupled to the insulating layer's first surface and one or more buss(es).

If the one or more buss(es) includes only one buss, the one buss is coupled to one or more of the plurality of segments. If the one or more buss(es) includes two busses, then the two busses are coupled to less than all of the plurality of segments.

In other, more detailed features of the invention, the gimbal has a longitudinal axis, and the one or more strut(s) includes a first strut that is located on one side of the gimbal's longitudinal axis, and a second strut that is located on the other side of the gimbal's longitudinal axis. Both the first strut and the second strut include the insulating layer and the supporting layer (see above). Also, the insulating layer can have a second surface, and further include a conducting layer that is coupled to the insulating layer's second surface. The conducting layer is configured to be coupled electrically to the disk drive read-write transducer.

In other, more detailed features of the invention, the insulating layer is made of polyimide, the supporting layer is made of stainless steel, and the conducting layer is made of copper or an alloy thereof. Also, the insulating layer can have a height that ranges in value from approximately 5 µm to approximately 20 µm, the supporting layer can have a height that ranges in value from approximately 15 µm to approximately 25 µm, and the conducting layer can have a height that ranges in value from approximately 5 µm to approximately 20 µm.

In other, more detailed features of the invention, the gimbal has a roll stiffness that ranges in value from approximately 0.55 µNm/deg to approximately 0.83 µNm/deg, and the gimbal has a pitch stiffness that ranges in value from approximately 0.54 µNm/deg to approximately 0.82 µNm/deg. Also, the one or more buss(es) can have a width that ranges in value from approximately 50 µm to approximately 200 µm. In addition, each of the plurality of segments can have a shape that is rectangular, square, circular, elliptical, or hatched.

In other, more detailed features of the invention, the gimbal has a value selected from the group consisting of a characteristic impedance and an insertion loss that is lower than if the supporting layer did not include the plurality of segments. Also, the one or more buss(es) can be laterally spaced away from the insulating layer.

In other, more detailed features of the invention, the one or more buss(es) is only one buss, and the one buss is coupled to all of the plurality of segments. In other detailed features of the invention, the one or more buss(es) includes a first buss and a second buss, the plurality of segments is located between the first buss and the second buss, the first buss is coupled to one or more of the plurality of segments, and the second buss is coupled to another one or more of the plurality of segments.

Another exemplary embodiment of the invention is a gimbal that is configured to be coupled to a slider having a disk drive read-write transducer. The gimbal includes one or more strut(s) having an insulating layer and a supporting layer. The insulating layer includes a first surface. The supporting layer includes a plurality of segments and is coupled to the insulating layer's first surface.

Another exemplary embodiment of the invention is a disk drive suspension that is configured to support a slider having a read-write transducer. The disk drive suspension includes a load beam and a gimbal that is coupled to the load beam and configured to couple to the slider. The gimbal includes one or more strut(s) having an insulating layer that includes a first surface, and a supporting layer that includes a plurality of segments that is coupled to the insulating layer's first surface and one or more buss(es). If the one or more buss(es) includes only one buss, the one buss is coupled to one or more of the plurality of segments. If the one or more buss(es) includes two busses, then the two busses are coupled to less than all of the plurality of segments.

An exemplary method according to the invention is a method for manufacturing a disk drive suspension gimbal. The method includes providing a supporting material and an insulating material, forming a supporting layer from the supporting material, forming an insulating layer from the insulating material that is coupled to the supporting layer, and removing a portion of the supporting layer to form a plurality of segments.

In other, more detailed features of the invention, the method further includes providing a conducting material, and forming a conducting layer from the conducting material that is coupled to the insulating layer. Also, the step of removing a portion of the supporting layer to form a plurality of segments also includes forming one or more buss(es) from the supporting layer. If the one or more buss(es) is only one buss, the one buss is coupled to one or more of the plurality of segments. If the one or more buss(es) includes two busses, then the two busses are coupled to less than all of the plurality of segments. In addition, if the one or more buss(es) is only one buss, then the one buss and the plurality of segments are formed so the one buss is coupled to all of the plurality of segments. Furthermore, if the supporting layer is formed so that the one or more buss(es) includes a first buss and a second buss, then the plurality of segments of the supporting layer is formed between the first buss and the second buss, and the first and second busses of the supporting layer are formed so the first buss is coupled to one or more of the plurality of segments and the second buss is coupled to another one or more of the plurality of segments.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, appended claims, and accompanying drawings, where:

DETAILED DESCRIPTION

Figure 5:
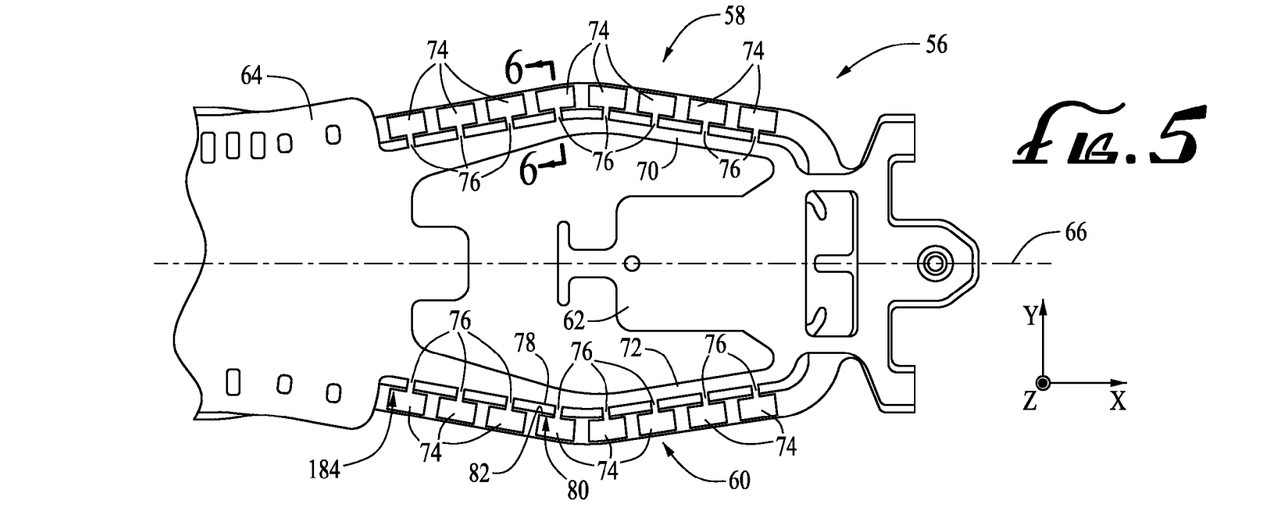
FIG. 5 is a partial top plan view of a gimbal according to a preferred embodiment.

Embodiments of the present invention include disk drive suspensions 14 that include low-stiffness gimbals 22. The gimbals according to embodiments of the present invention have low stiffness values because of the mechanical configuration of the supporting layer 48, the insulating layer 52, and the conducting layer 50, and the mechanical interfaces between the three layers. Referring additionally to FIG. 5, embodiments of disk drive suspension gimbals 56 according to the present invention include a pair of struts 58 and 60 that couple the gimbal's tongue-shaped part 62 to a proximal end 64 of the gimbal, which, in turn, is coupled to the load beam's distal end 38.

Figure 6:
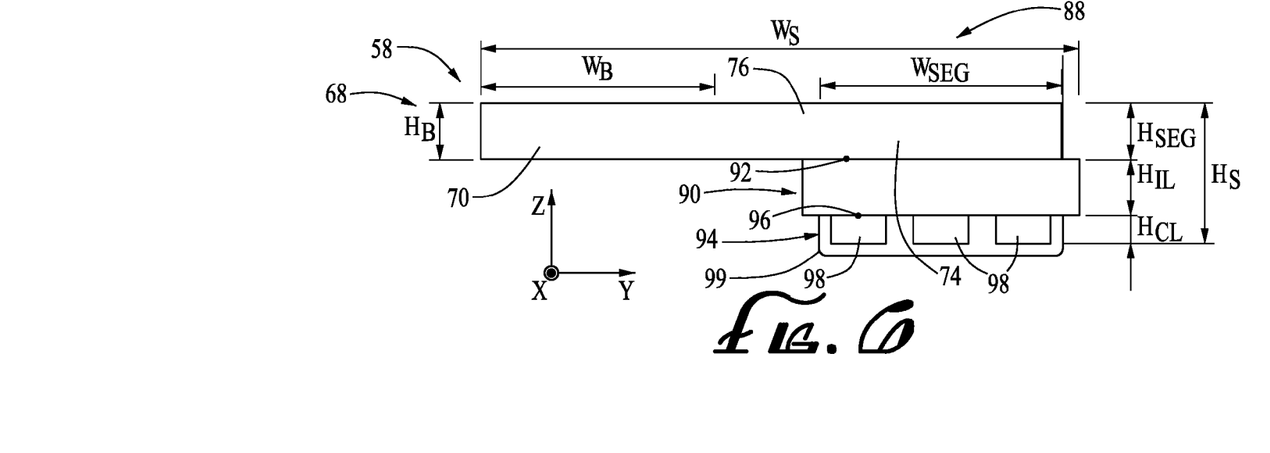
FIG. 6 is a sectional view of the gimbal shown in FIG. 5 along line 6-6.

Conceptually, the gimbal 56 has a longitudinal axis 66 that extends the length of the gimbal, and the pair of struts 58 and 60 includes a first strut 58 on one side of the gimbal's longitudinal axis and a second strut 60 on the other side of the gimbal's longitudinal axis. The struts have a mirrored configuration, thus, the mechanical configuration of the first strut minors the mechanical configuration of the second strut. Referring additionally to FIG. 6, which is a sectional view of one of the struts, the width of each strut "$W_S$" can range from approximately 140 μm to approximately 450 μm, and the height of the strut "$H_S$" can range from approximately 30 μm to approximately 60 μm.

The supporting layer 68 of each of the gimbal's struts 58 and 60 includes one buss 70 and 72, respectively, which extends in a curved/angled manner from the tongue-shaped part 62 to the gimbal's proximal end 64. Also included in the supporting layer of each of the gimbal's struts is a plurality of segments 74. In this document, the word "plurality" means two or more. In FIG. 5, there are eight segments on each side of the longitudinal axis 66. In the embodiment of the gimbal shown in FIG. 5, all of the eight segments on each side of the longitudinal axis are coupled to their adjacent buss through extensions 76. In general, each of the extensions in this embodiment extends perpendicularly from an outside edge 78 of the buss and couple to a midpoint 80 along an inside edge 82 of the segment. In additional embodiments of gimbals according to the present invention, for example the embodiments 84 and 86 shown in FIGS. 8 and 9, respectively, the extensions extend from the outside edge of the buss to locations on the segment other than the midpoint of the inside edge.

As seen in the illustrative embodiment of FIG. 5, individual segments 74 are longitudinally discontinuous, meaning that as one travels in a line in a longitudinal direction along struts 56 or 60, one encounters alternating areas having an electrically conducting segment, then no electrically conducting area, then another electrically conducting segment, then no electrically conducting area, etc.

Also as seen in the embodiment of FIG. 5, each extension 76 that connects a respective segment 74 to bus 70/72 is less than half as wide as its corresponding segment 74 as measured in a longitudinal direction, and more particularly, is less than one third as wide as its corresponding segment 74.

Referring again to FIG. 6, the portion 88 of the strut 58 and 60 that includes the insulating layer 90 is spaced laterally away from the supporting layer's buss 70. The insulating layer includes a first surface 92 that is coupled to the plurality of segments 74 but is not coupled to the buss. Thus, the supporting layer's plurality of segments supports the insulating layer, and the plurality of segments, in turn, is supported by the buss via the extensions 76, which mechanically couple the plurality of segments to the buss. Also shown in FIG. 6, the conducting layer 94, which is coupled to a second surface 96 of the insulating layer, is formed into traces 98 that are configured to be coupled to electrical leads (not shown) that interface with the slider's read-write transducer 10. Optionally, an additional thin insulating layer 99, e.g., a layer of polyimide, can cover and insulate the traces of the conducting layer. Also, the traces can be plated with gold or nickel followed by gold to inhibit corrosion.

Figure 7A:
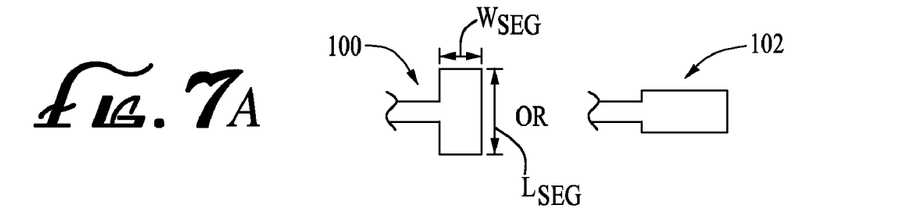
FIG. 7A includes partial top plan views of segments having rectangular shapes according to preferred embodiments.
Figure 7B:
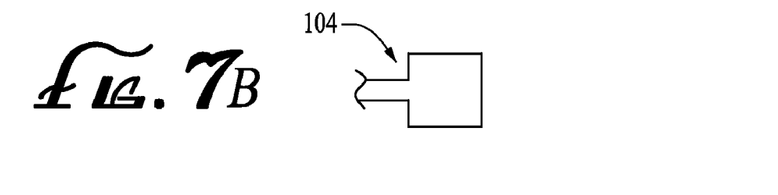
FIG. 7B is a partial top plan view of a segment having a square shape according to a preferred embodiment.
Figure 7C:
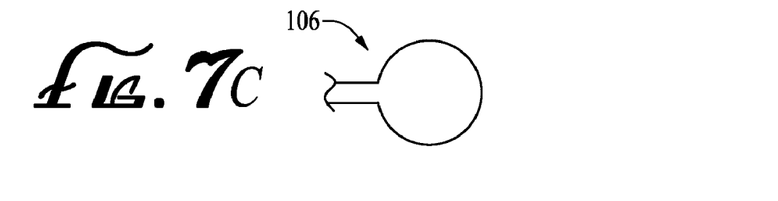
FIG. 7C is a partial top plan view of a segment having a circular shape according to a preferred embodiment.
Figure 7D:
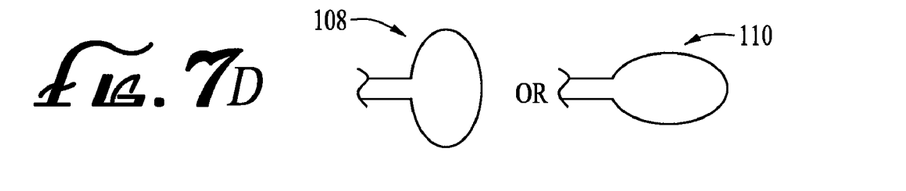
FIG. 7D includes partial top plan views of segments having elliptical shapes according to preferred embodiments.
Figure 7E:
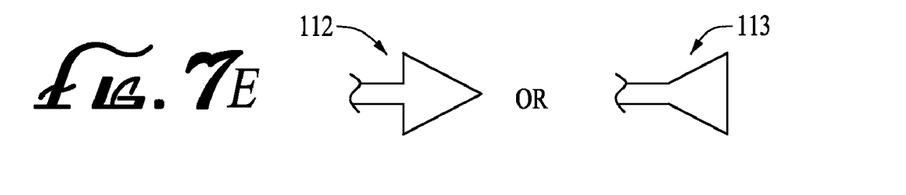
FIG. 7E includes partial top plan views of segments having triangular shapes according to preferred embodiments.
Figure 7F:
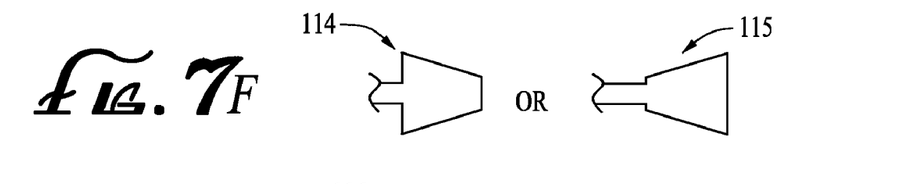
FIG. 7F includes partial top plan views of segments having trapezoidal shapes according to preferred embodiments.
Figure 7G:
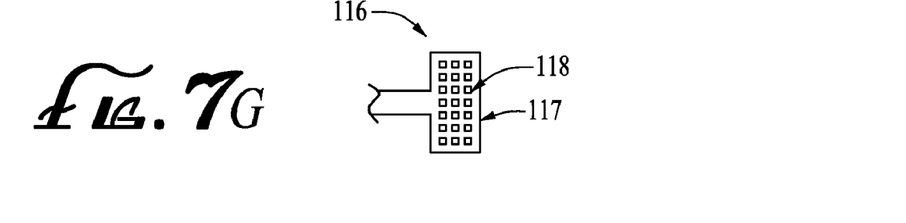
FIG. 7G is a partial top plan view of a segment having a hatched shape according to preferred embodiments.

Each of the plurality of segments 74 can have rectangular shapes 100 and 102 as shown in FIGS. 5 and 7A, or another shape, for example, a square shape 104 (see FIG. 7B), a circular shape 106 (see FIG. 7C), elliptical shapes 108 and 110 (see FIG. 7D), triangular shapes 112 and 113 (see FIG. 7E), trapezoidal shapes 114 and 115 (see FIG. 7F), a hatched shape 116 (see FIG. 7G), or any combination of these shapes. The example segment 117 having a hatched shape 116 that is shown in FIG. 7G, includes holes 118 that extend partially or completely through the entire height of the segment "$H_{SEG}$" (see FIG. 6). While the hatched-shape segment shown in FIG. 7G is rectangular in shape and the holes are square, in other embodiments, the hatched-shape segment can have any shape, e.g., a square, circular, elliptical, triangular, or trapezoidal shape, or any combination of these shapes, and the hole can have a shape other than square. Also, the dimensions, e.g., the length, width, and height, of each of the segments can vary in value. For example, in the case of the rectangular-shaped segments shown in FIGS. 5, 6, and 7A, the segments have a height "$H_{SEG}$" that can range from approximately 15 μm to approximately 25 μm, a length "$L_{SEG}$" that can range from approximately 200 μm to approximately 1000 μm, and a width "$W_{SEG}$" that can range from approximately 100 μm to approximately 200 μm. In the embodiment shown in FIGS. 5 and 6, the height of the segment "$H_{SEG}$" is the same as the height of the buss "$H_B$", because the thickness of the entire supporting layer 68 is uniform in FIG. 6. The width of the buss "$W_B$" can range from approximately 50 μm to approximately 200 μm.

The insulating layer 90 in the embodiment 56 shown in FIGS. 5 and 6 can have a height "$H_{IL}$" that ranges in value from approximately 5 μm to approximately 20 μm. For example, the insulating layer in the embodiment of FIG. 6 can have a height "$H_{IL}$" of approximately 5 μm. In additional example embodiments, the insulating layer can have a height "$H_{IL}$" of approximately 10 μm.

The conducting layer 94 of the embodiment 56 shown in FIGS. 5 and 6 can have a height "$H_{CL}$" that ranges from approximately 5 μm to approximately 20 μm. In an example embodiment, the conducting layer has a height "$H_{CL}$" of approximately 12 μm. Accordingly, the overall height of the strut "$H_S$" shown in FIGS. 5 and 6, is 35 μm when the height of the conducting layer "$H_{CL}$" is 12 μm, the height of the insulating layer 90 is 5 μm, and the height of the segment "$H_{SEG}$" is 18 μm; and $H_S$ is 40 μm when the height of the conducting layer "$H_{CL}$" is 12 μm, the insulating layer has a height of 10 μm, and the height of the segment "$H_{SEG}$" is 18 μm.

The embodiment of the gimbal 56 shown in FIGS. 5 and 6, in which the height of the conducting layer "$H_{CL}$" is 12 μm, the height of the insulating layer "$H_{IL}$" is 5 μm, and the height of the segment "$H_{SEG}$" is 18 μm, has a pitch stiffness "$K_P$" equal to 0.58 μNm/deg and a roll stiffness "$K_R$" equal to 0.55 μNm/deg. In another embodiment of the gimbal shown in FIGS. 5 and 6, in which the height of the conducting layer "$H_{CL}$" is 12 μm, the height of the insulating layer "$H_{IL}$" is 10 μm, and the height of the segment "$H_{SEG}$" is 18 μm, the gimbal has a pitch stiffness "$K_P$" equal to 0.82 μNm/deg and a roll stiffness "$K_R$" equal to 0.71 μNm/deg. Accordingly, the embodiment of the gimbal that has the taller insulating layer, i.e., the 10 μm thick insulating layer, is stiffer.

Figures 8, 9:
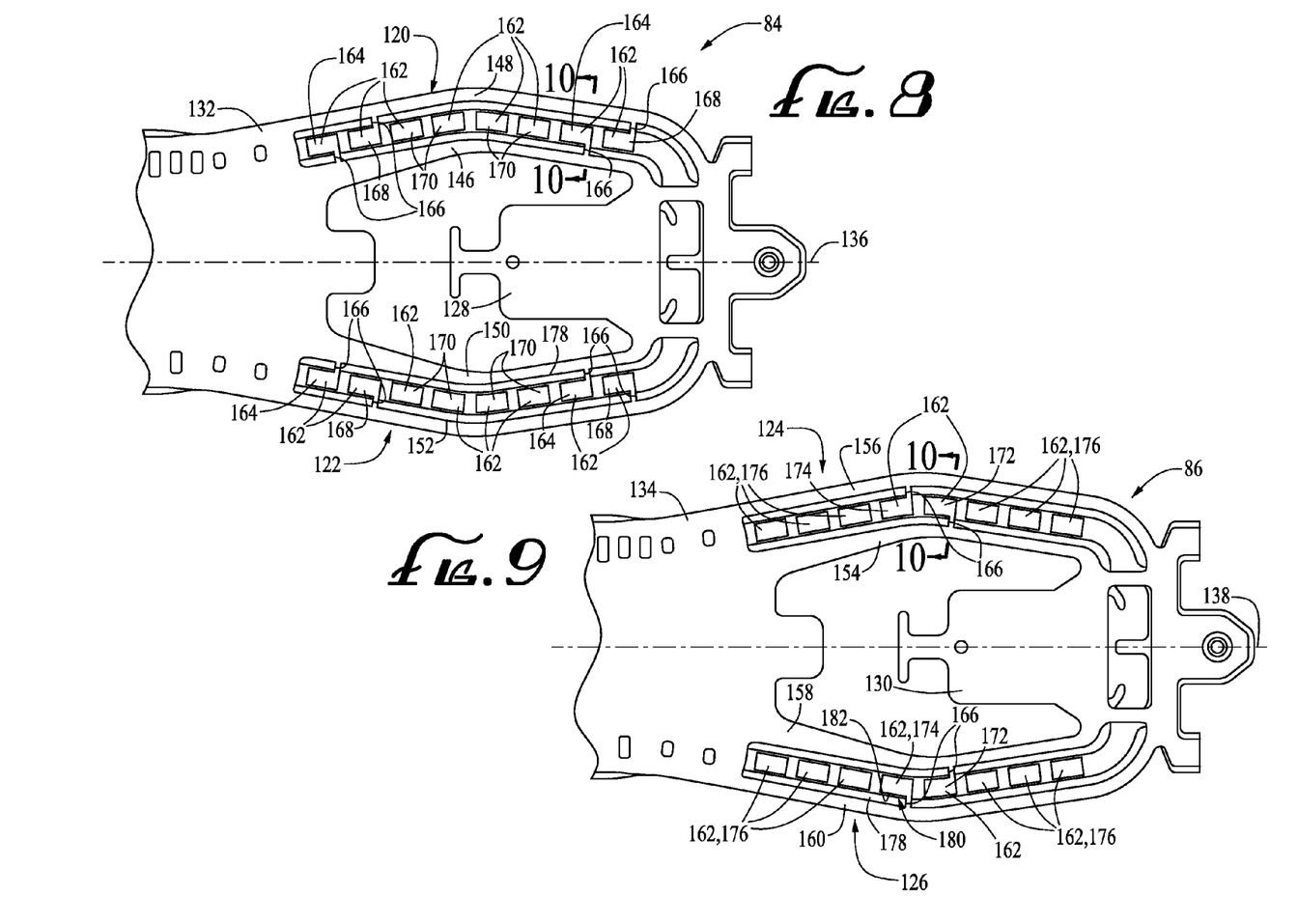
FIG. 8 is a partial top plan view of another gimbal according to a preferred embodiment.
FIG. 9 is a partial top plan view of another gimbal according to a preferred embodiment.
Figure 10:
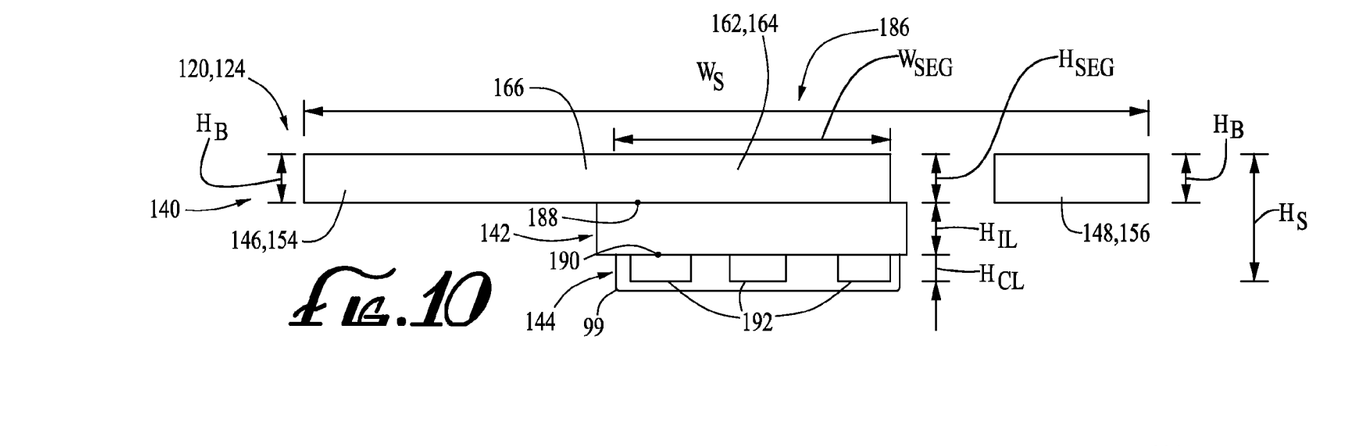
FIG. 10 is a sectional view of the gimbals shown in FIGS. 8 and 9 along line 10-10.

Additional embodiments of gimbals 84 and 86 that are configured to be included in disk drive suspensions 14 according to the present invention are shown in FIGS. 8, 9, and 10. FIGS. 8 and 9 are partial top plan views of two different embodiments 84 and 86, respectively, and FIG. 10 is a sectional view along line 10-10 in both FIG. 8 and FIG. 9. Only one section view, i.e., FIG. 10, is needed because of the common geometries of FIG. 8 and FIG. 9 along line 10-10.

FIGS. 8, 9, and 10, the disk drive suspension gimbals 84 and 86 each include a pair of struts 120-126 that couple the gimbals' tongue-shaped parts 128 and 130 to the gimbals' proximal ends 132 and 134, which, in turn, are coupled to the load beams' distal ends 38, respectively. As was the case in the embodiment of the gimbal 56 shown in FIGS. 5 and 6, the embodiments of the gimbals shown in FIGS. 8, 9, and 10 conceptually include longitudinal axes 136 and 138 that extend the length of each of the gimbals. The first strut 120 and 124 of the pair of struts in each embodiment 84 and 86, respectively, is on one side of the longitudinal axis, and the second strut 122 and 126, respectively, is on the other side of the longitudinal axis. As shown in FIGS. 8 and 9, the pair of struts, in each embodiment, have a mirrored configuration relative to the longitudinal axis. In these two embodiments, the width of each strut "$W_S$" (see FIG. 10) can range from approximately 100 μm to approximately 500 μm, and the height of each strut "$H_S$", defined by the combined height of the supporting layer 140, the insulating layer 142, and the conducting layer 144, can range from approximately 30 μm to approximately 60 μm.

In the embodiments of the gimbals 84 and 86 shown in FIGS. 8, 9, and 10, the supporting layer 140 of each gimbal's strut 120-126 includes two busses 146-160, i.e., a first buss 146, 150, 154, and 158 and a second buss 148, 152, 156, and 160, which extend in a curved/angled manner from the tongue-shaped part 128 and 130 to the gimbal's proximal end 132 and 134. Within each strut, the two busses tend to run parallel to one another on either side of a plurality of segments 162, which also are considered to be included in the supporting layer. As shown in FIGS. 8 and 9, there are eight segments on each side of the longitudinal axis 136 and 138, respectively.

In the embodiment 84 shown in FIG. 8, two segments 164 of the plurality of segments 162 in each strut 120 and 122 are coupled to the first buss 146 and 150 via extensions 166, and two other segments 168 in each strut are coupled to the second buss 148 and 152 via additional extensions 166. Accordingly, in the embodiment shown in FIG. 8, four segments 164 and 168 in each strut are coupled to the busses. While the segments 164 and 168 that are coupled to the busses are adjacent to one another in FIG. 8, in additional embodiments, the segments 164 and 168 that are coupled to the busses are not adjacent to one another. Between the segments 164 and 168 that are coupled to the first and second busses are segments 170 that are not coupled to either buss.

In the embodiment 86 shown in FIG. 9, only one segment 172 in each strut 124 and 126 is coupled to the first buss 154 and 158, respectively, and a second segment 174 in the strut is coupled to the second buss 156 and 160, respectively. Accordingly, two of the segments 172 and 174 in each strut are coupled to the busses. While the segments 172 and 174 that are coupled to the busses are adjacent to one another in FIG. 9, in additional embodiments, the segments 172 and 174 that are coupled to the busses are not adjacent to one another. The struts shown in FIG. 9 also include other segments 176 that are not coupled to a buss.

In general, each of the extensions 166 in the embodiments 84 and 86 shown in FIGS. 8 and 9 extends perpendicularly from an edge 178 of the buss 146-160 and couple to a distal endpoint 180 along an inside edge 182 of the segment 166. In additional embodiments, for example the embodiment 56 shown in FIG. 5, the extensions 76 extend from the outside edge 78 of the buss 70 and 72 to locations on the segment 74 other than the distal endpoint of the inside edge, for example, the midpoint 80 along the inside edge 82 of the segment (see FIG. 5), a proximal endpoint 184 along the inside edge of the segment, or another point along any edge of the segment.

Referring again to FIG. 10, it can be seen that the portion 186 of each strut 120 and 124 that includes the insulating layer 142 is spaced laterally away from the busses 146 and 154. In each strut, a first surface 188 of the insulating layer is coupled to the plurality of segments 162. The segments 164 that couple to the busses support the insulating layer, and, in turn, are supported by the busses via the extensions 166. Also shown in FIG. 10, the conducting layer 144, which is coupled to a second surface 190 of the insulating layer, is formed into traces 192 that are configured to be coupled to electrical leads (not shown) that interface with the slider's read-write transducer 10. As discussed in reference to the embodiment 56 of FIGS. 5 and 6, the traces in the conducting layers of the embodiments 84 and 86, which are shown in FIGS. 8 and 9, respectively, can be coated with a thin additional insulating layer 99, and/or the traces can be plated with gold or nickel followed by gold.

As was the case in the embodiment 56 shown in FIGS. 5 and 6, each of the plurality of segments 162 in the embodiments 84 and 86 shown in FIGS. 8, 9, and 10 can have the general shapes 100-118 shown in FIGS. 7A-F, or any combination of these shapes. Also, the dimensions, i.e., the height "$H_{SEG}$", the width "$W_{SEG}$", and the length "$L_{SEG}$", of each of the segments in the embodiments shown in FIGS. 8, 9, and 10 can vary in value as discussed for the embodiment 56 shown in FIGS. 5 and 6.

The insulating layer 142 in the embodiments 84 and 86 shown in FIGS. 8, 9, and 10 can have a height "$H_{IL}$" that ranges in value from approximately 5 μm to approximately 20 μm. For example, the insulating layer can have a height "$H_{IL}$" of approximately 5 μm. In additional example embodiments, the insulating layer can have a height "$H_{IL}$" of approximately 10 μm.

The conducting layer 144 of the embodiments 84 and 86 shown in FIGS. 8, 9, and 10 can have a height "$H_{CL}$" that ranges from approximately 5 μm to approximately 20 μm. In example embodiments, the conducting layers have heights "$H_{CL}$" of approximately 12 μm. Accordingly, the overall height of the struts "$H_S$" shown in FIGS. 8, 9, and 10, is 35 μm when the height of the conducting layer "$H_{CL}$" is 12 μm, the height of the insulating layer "$H_{IL}$" is 5 μm, and the height of the segment "$H_{SEG}$" is 18 μm; and $H_S$ is 40 μm when the height of the conducting layer "$H_{CL}$" is 12 μm, the height of the insulating layer "$H_{IL}$" is 10 μm, and the height of the segment "$H_{SEG}$" is 18 μm.

In the embodiment of the gimbal 84 shown in FIGS. 8 and 10, in which the height of the conducting layer "$H_{CL}$" is 12 μm, the height of the insulating layer "$H_{IL}$" is 5 μm, and the height of the segment "$H_{SEG}$" is 18 μm, has a pitch stiffness "$K_P$" equal to 0.60 μNm/deg and a roll stiffness "$K_R$" equal to 0.65 μNm/deg. In another embodiment of the gimbal shown in FIGS. 8 and 10, in which the height of the conducting layer "$H_{CL}$" is 12 μm, the height of the insulating layer "$H_{IL}$" is 10 μm, and the height of the segment "$H_{SEG}$" is 18 μm, the gimbal has a pitch stiffness "$K_P$" equal to 0.81 μNm/deg and a roll stiffness "$K_R$" equal to 0.83 μNm/deg. Accordingly, the embodiment of the gimbal that has the taller insulating layer, i.e., the 10 μm high insulating layer, is stiffer.

The embodiment 86 of the gimbal shown in FIGS. 9 and 10, in which the height of the conducting layer "$H_{CL}$" is 12 μm, the height of the insulating layer "$H_{IL}$" is 5 μm, and the height of the segment "$H_{SEG}$" is 18 μm, has a pitch stiffness "$K_P$" equal to 0.54 μNm/deg and a roll stiffness "$K_R$" equal to 0.68 μNm/deg. In the embodiment of the gimbal shown in FIGS. 9 and 10, in which the height of the conducting layer "$H_{CL}$" is 12 μm, the height of the insulating layer "$H_{IL}$" is 10 μm, and the height of the segment "$H_{SEG}$" is 18 μm, the gimbal has a pitch stiffness "$K_P$" equal to 0.72 μNm/deg and a roll stiffness "$K_R$" equal to 0.82 μNm/deg. Again, the embodiment of the gimbal that has the taller insulating layer, i.e., the 10 μm high insulating layer, is stiffer.

The embodiments of the gimbals 84 and 86 shown in FIGS. 8, 9, and 10 differ from the embodiment of the gimbal 56 shown in FIGS. 5 and 6. In particular, each of the struts 120-126 of the embodiments 84 and 86 shown in FIGS. 8, 9, and 10 include two busses 146-160 instead of the one buss 70 and 72 included in the embodiment 56 shown in FIGS. 5 and 6. Also, not all of the plurality of segments 162 is coupled to a buss 146-160 in the embodiments 84 and 86 of FIGS. 8, 9, and 10. More specifically, in the embodiment 84 of FIGS. 8 and 10, only two of the segments 164 in each strut are coupled to one of the busses, while two additional segments 168 are coupled to the other of the two busses. In contrast, only one of the segments 172 in each strut in the embodiment 86 of FIGS. 9 and 10 is coupled to one the two busses, and only one other segment 174 is coupled to the other of the two busses. Yet another distinction between the embodiments shown in FIGS. 8, 9, and 10 and the embodiment 56 shown in FIGS. 5 and 6 is that while the extensions 166 shown in FIGS. 8, 9, and 10 couple a buss 146-160 to a distal endpoint 180 of a segment's inside edge 182, the extensions 76 shown in FIGS. 5 and 6 couple the buss 70 and 72 to a midpoint 80 of a segment's inside edge 82.

Comparing the stiffness values, i.e., the pitch stiffness values "$K_P$" and the roll stiffness values "$K_R$", between the embodiment 56 shown in FIGS. 5 and 6, the embodiment 84 shown in FIGS. 8 and 10, and the embodiment 86 shown in FIGS. 9 and 10, it can be seen that the stiffness values are affected by several factors. First, the stiffness values are affected by the number of busses, i.e., either one buss 70 and 72 or two busses 146-160, that are included in each strut 58, 60, and 120-126. Second, the stiffness values are affected by the number of segments 74 and 162 that are coupled to the busses. Third, the stiffness values are affected by the location of the segment(s) that is coupled to the buss(es) relative to the gimbal's proximal and distal ends. An additional factor that affects the stiffness values of the embodiments is the height of the insulating layer "$H_{IL}$". The stiffness values are less for embodiments where the height of the insulating layer is less.

Figure 11:
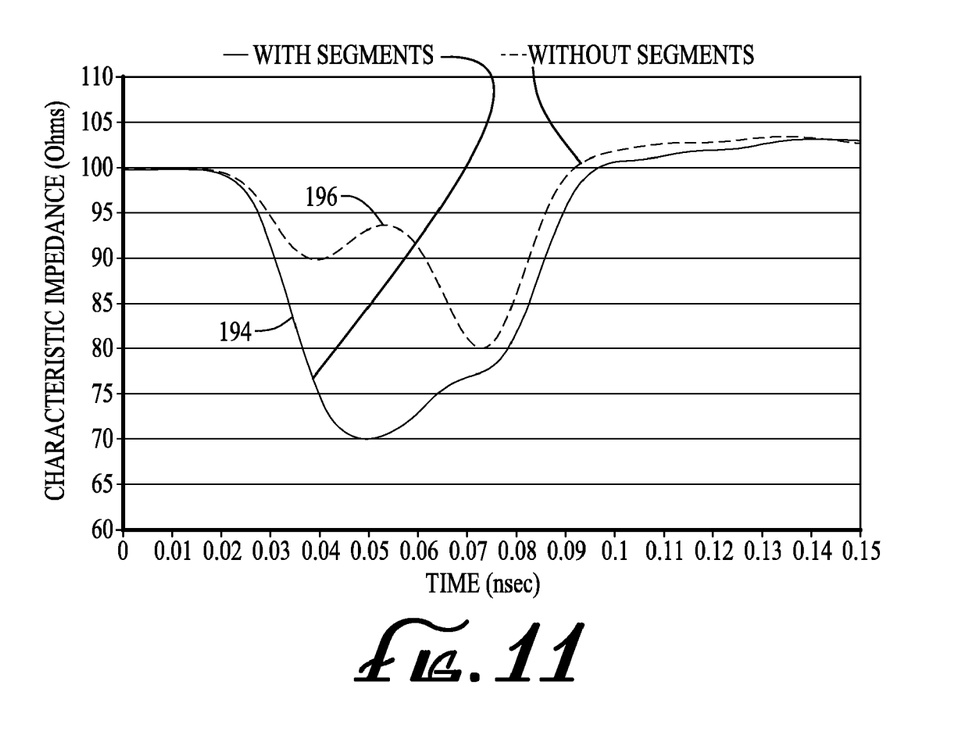
FIG. 11 is a graph of characteristic impedance as a function of time for gimbals having segments according to preferred embodiments and other embodiments of gimbals without segments.
Figure 12:
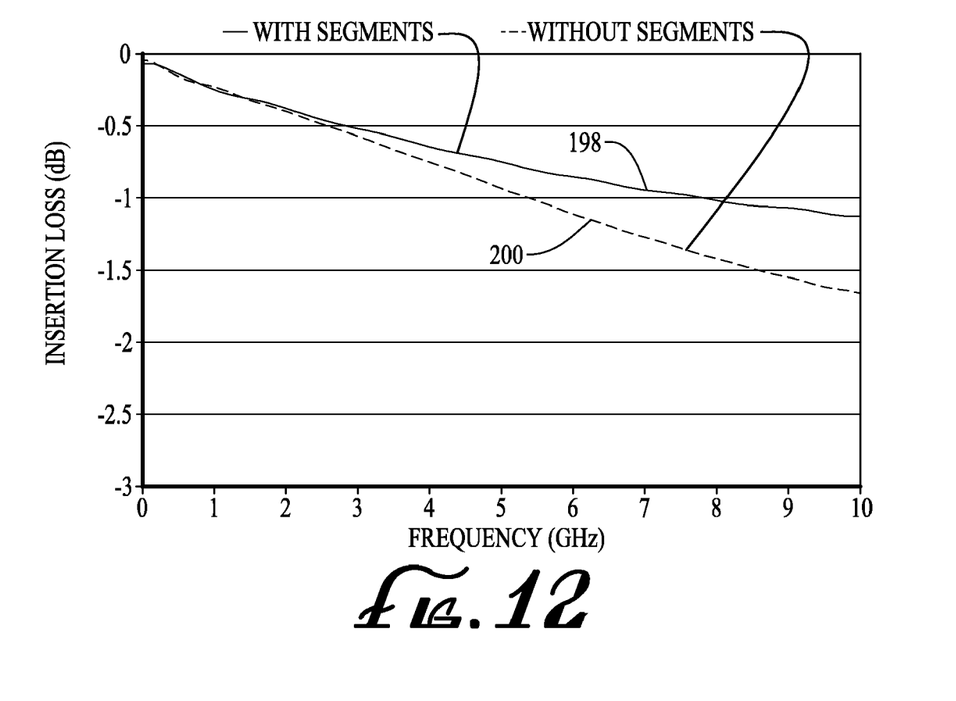
FIG. 12 is a graph of insertion loss as a function of frequency for gimbals having segments according to preferred embodiments and other embodiments of gimbals without segments.

Advantageously, the shape, the dimensions, and the discontinuous nature of the segments 74 and 162, i.e., each of the segments physically are separate from the other segments, and the fact that the segments are made from a material that conducts electricity, e.g., stainless steel, results in gimbal embodiments that offer improved electrical performance, without greatly increasing the gimbal's stiffness. The improved electrical performance that results from the embodiments of the present invention is shown in the graphs of FIGS. 11 and 12. In particular, FIG. 11 is a graph of characteristic impedance as a function of time in nanoseconds both for a gimbal 56, 84, and 86 having struts 58, 60, and 120-126 that include the plurality of segments (see line 194) and for a gimbal having struts with no segments (see line 196). As shown in FIG. 11, the characteristic impedance is lower in the 0.02 to 0.14 nanosecond timeframe, and a large difference in characteristic impedance is seen in the 0.03 nanosecond to 0.07 nanosecond timeframe with a difference greater than approximately 20 ohms at a 0.05 nanosecond data rate.

FIG. 12 is a graph of insertion loss as a function of frequency both for a gimbal 56, 84, and 86 having struts 58, 60, and 120-126 that include the plurality of segments 74 and 162 (see line 198) and for a gimbal with no segments (see line 200). Based on FIG. 12, it can be seen that the use of gimbals having struts with segments results in a lower value of insertion loss as a function of frequency beyond approximately 2 GHz. Accordingly, the embodiments of the present invention that includes segments advantageously result in gimbals having lower characteristic impedance values as a function of data rate for data rates from approximately 0.02 nanosecond to 0.14 nanosecond, and lower values of insertion loss as a function of frequency above approximately 2 GHz than gimbals without segments.

The improved electrical performance offered by the embodiments of the present invention, i.e., the segments 74 and 162 provide a beneficial reference plane, as shown in FIGS. 11 and 12, is a result of the struts 58, 60, and 120-126 including the plurality of segments, regardless of whether the segments are coupled to the buss 70, 72, and 146-160. This is true because, in a differential pair configuration, the electrical signal is split in half, with one half positive and the other half negative. These signals are sent down two of the traces 98 and 192. The signals and their respective electrical fields travel between the two traces and independent of the ground layer, i.e., the ground plane. If the traces come near another metal layer or ground layer, then some of the fields couple into that layer reducing the impedance between the two traces. Embodiments of the present invention take advantage of this effect, via the segments, to adjust/reduce the impedance of the trace pairs. Because the metal layer of the segments is only used to improve coupling between the trace pairs, and not for signal transmission, the voltage level of the metal layer does not matter (see L. W. Ritchey, Differential Signaling Doesn't Require Differential Impedance or, How to Design a Differential Signal Circuit, *Printed Circuit Design*, March 1999, which is incorporated by reference herein).

Embodiments 56, 84, and 86 of the present invention can be formed using a variety of selectively additive processes that are known to individuals having ordinary skill in the art, for example, casting, vapor deposition, and plating which build-up the supporting layer 68 and 140 first followed by the insulating layer 90 and 142, and then followed by the conducting layer 94 and 144. Thus, the supporting layer, the insulating layer and the conducting layer are formed in a sequential manner on top of one another using additive processes that are known to individuals having ordinary skill in the art.

Figure 13A:
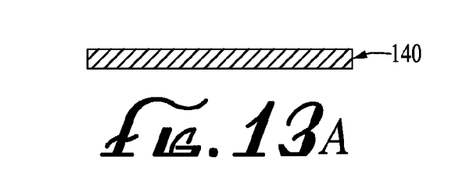
FIG. 13A is a sectional view of a supporting layer that is formed according to a preferred method.
Figure 13B:
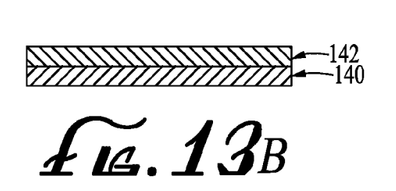
FIG. 13B is a sectional view of an insulating layer and the supporting layer of FIG. 13A where the insulating layer is formed according to a preferred method.

FIGS. 13A-L are sectional views of the layers 140-144 that are included in the struts 120-126 of the embodiments 84 and 86 shown in FIGS. 8, 9, and 10. FIGS. 13A-L illustrate the sequential formation of the individual layers. More specifically, FIG. 13A shows the supporting layer 140 after it has been formed from the supporting material, e.g., cold rolled 300 series stainless steel. Next, FIG. 13B shows the insulating layer 142 after it has been formed from the insulating material, e.g., polyimide, on top of the supporting layer and cured. Subsequently, a vapor deposited adhesion layer 201 can be deposited on top of the insulating layer 142, as described in co-pending U.S. patent application Ser. Nos. 11/179,707 and 11/340,298 to Schreiber et al., which are incorporated by reference herein.

Figure 13C:
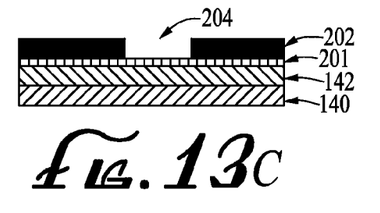
FIG. 13C is a sectional view of a resist layer, an adhesion layer, and the insulating and supporting layers of FIG. 13B where the resist layer and the adhesion layer are formed according to a preferred method.
Figure 13D:
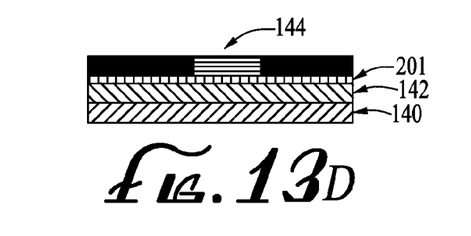
FIG. 13D is a sectional view of a conducting layer and the resist, adhesion, insulating, and supporting layers of FIG. 13C where the conducting layer is formed according to a preferred method.
Figure 13E:
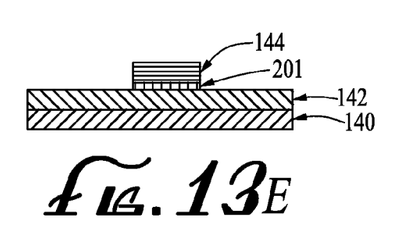
FIG. 13E is a sectional view of the conducting, adhesion, insulating, and supporting layers of FIG. 13D where the resist layer and portions of the adhesion layer have been removed according to a preferred method.

FIG. 13C shows a resist layer 202 that has been formed from a resist material on top of the adhesion layer 201. The resist material has been exposed and developed such that the resist layer includes a gap 204. FIG. 13D shows the conducting layer 144 after it has been formed from the conducting material, e.g., copper or an alloy thereof, on top of the adhesion layer and within the gap in the resist layer. Next, the resist layer and the adhesion layer, which is coupled between the conducting layer and the insulating layer 142, are removed, e.g., stripped, from the top surface of the insulating layer, as shown in FIG. 13E. While not shown in FIGS. 13D-13L, the conducting layer can be formed into traces 54, 98, and 912, as shown in FIGS. 4, 6, and 10, respectively.

Figure 13F:
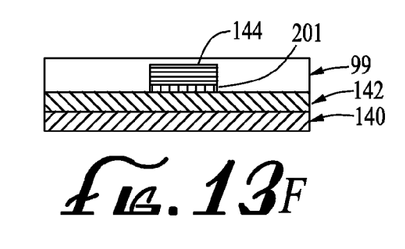
FIG. 13F is a sectional view of an additional insulating layer and the conducting, adhesion, insulating, and supporting layers of FIG. 13E where the additional insulating layer has been formed according to a preferred method.
Figure 13G:
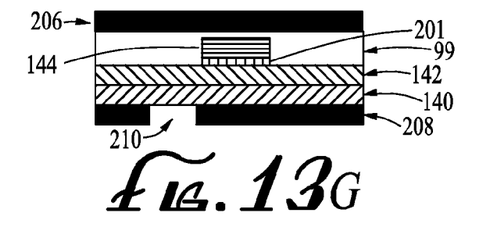
FIG. 13G is a sectional view of resist layers, the additional insulating layer, and the conducting, adhesion, insulating, and supporting layers of FIG. 13F where the resist layers have been formed according to a preferred method.
Figure 13H:
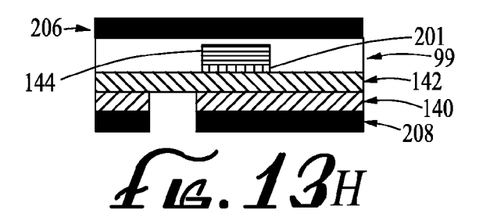
FIG. 13H is a sectional view of the resist layers, the additional insulating layer, and the conducting, adhesion, insulating, and supporting layers of FIG. 13G where a portion of the supporting layer has been removed according to a preferred method.
Figure 13I:
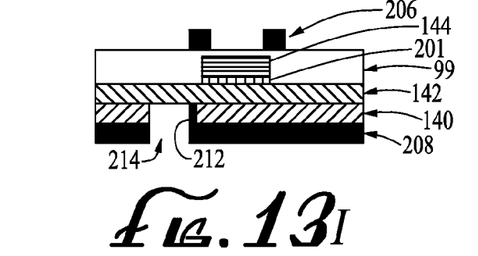
FIG. 13I is a sectional view of the resist layers, the additional insulating layer, and the conducting, adhesion, insulating, and supporting layers of FIG. 13H where portions of the resist layer that is coupled to the additional insulating layer have been removed and additional resist material has been added to the other resist layer according to a preferred method.
Figure 13J:
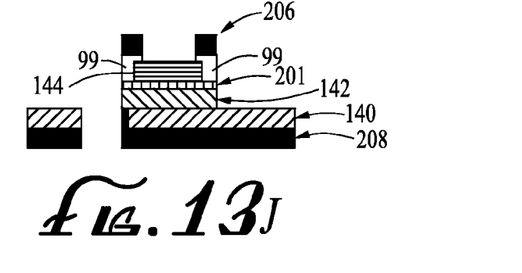
FIG. 13J is a sectional view of the resist layers, the additional insulating layer, and the conducting, adhesion, insulating, and supporting layers of FIG. 13I where portions of the insulating layer and the additional insulating layer have been removed according to a preferred method.
Figure 13K:
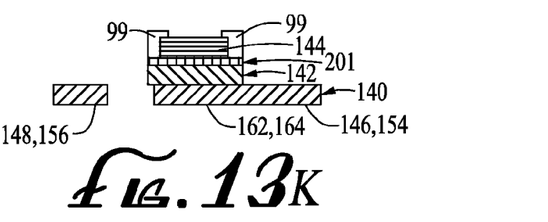
FIG. 13K is a sectional view of the additional insulating layer and the conducting, adhesion, insulating, and supporting layers of FIG. 13J where the resist layers have been removed according to a preferred method.
Figure 13L:
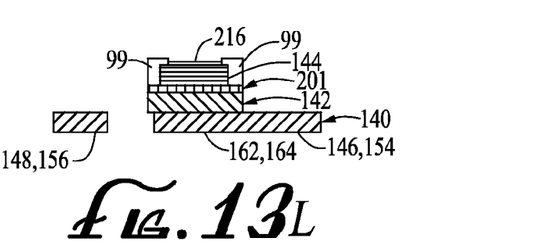
FIG. 13L is a sectional view of the additional insulating layer and the conducting, adhesion, insulating, and supporting layers of FIG. 13K where the conducting layer has had a layer of gold or nickel and gold deposited on top of it according to a preferred method.

FIG. 13F shows an additionally insulating layer 99 that has been deposited on top of the initial insulating layer 142 and the conducting layer 144, and cured. In FIG. 13G, resist layers 206 and 208 have been added to the additional insulating layer and the supporting layer 140, respectively. The resist layer 208 that is coupled to the supporting layer has been formed with a gap 210, through which the support layer is etched as shown in FIG. 13H. The resist layer 208 that is coupled to the supporting layer is formed in a shape that defines the shape 100-118 (previously discussed) of the segments 162. FIG. 13I shows the partial removal of the resist layer 206 from above the additional insulating layer, and the addition of resist material 212 within a hole 214 that was etched into the supporting layer. As shown in FIG. 13J, the insulating layers 99 and 142 have been etched, and in FIG. 13K, the resist layers 206 and 208 have been removed. The conducting layer is shown plated with a thin layer 216 of gold or nickel and gold in FIG. 13L. It should be apparent to those having ordinary skill in the art that the use of photosensitive polyimide processes in the formation of the dielectric features herein is additionally incorporated.

While FIGS. 13A-L show an example of the sequence in which the struts 120-126 of the embodiments 84 and 86 shown in FIGS. 8, 9, and 10 are formed, if the isolated buss 148 and 156 was not formed in FIGS. 13A-L, the same figures can be used to illustrate the formation of the struts 58 and 60 in the embodiment 56 shown in FIGS. 5 and 6.

Figure 14:
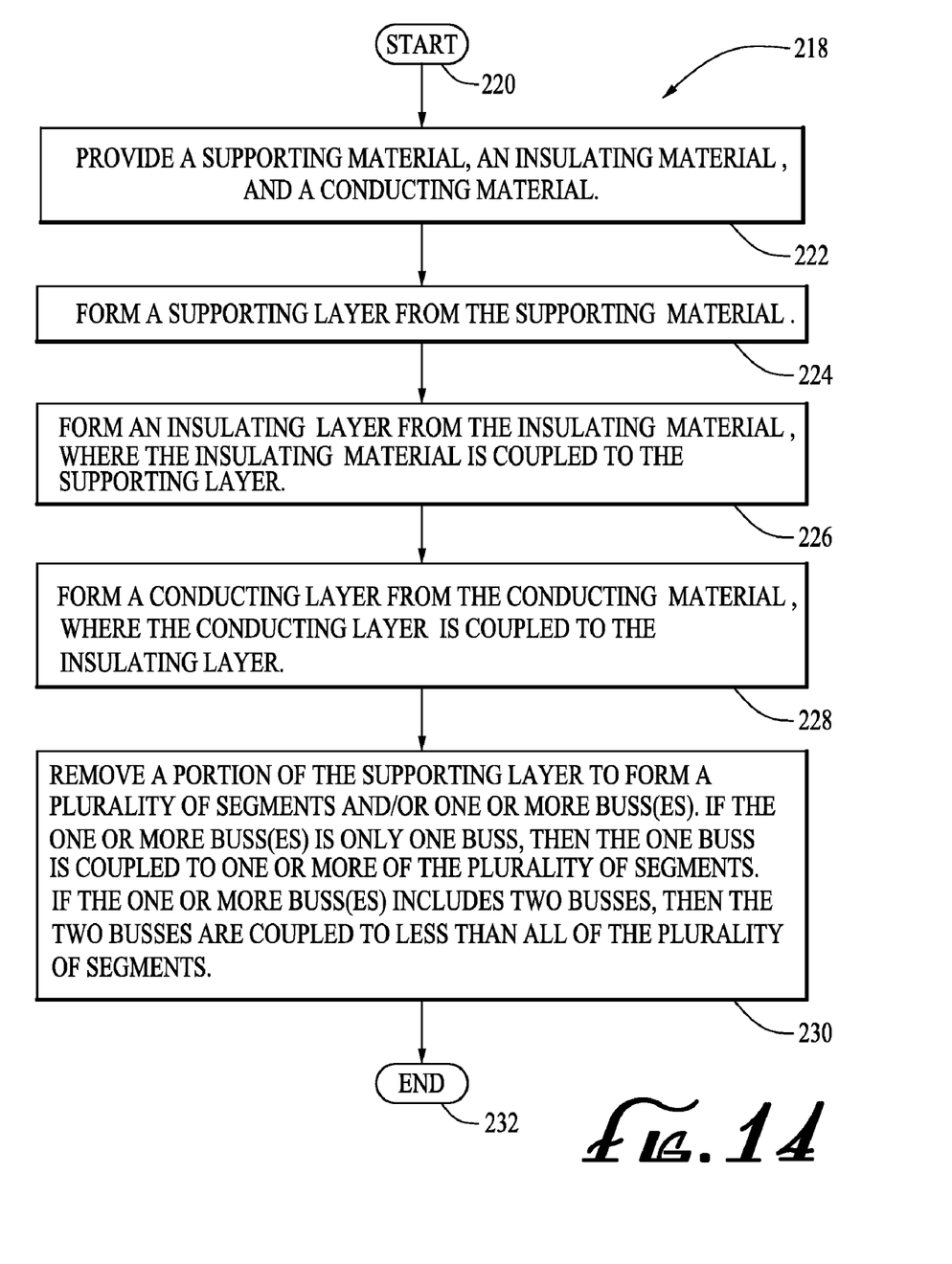
FIG. 14 is a flowchart for an example method of manufacturing a disk drive suspension according to the invention.

An exemplary method for manufacturing a disk drive suspension gimbal 56, 84, and 86 according to the present invention is illustrated in the algorithm 218 of FIG. 14. After starting the method at step 220, the next step 222 is to provide a supporting material, an insulating material, and a conducting material. The next step 224 is to form a supporting layer 68 and 140 from the supporting material. Next, at step 226, an insulating layer 142 is formed from the insulating material so the insulating layer is coupled to the supporting layer. At step 228, a conducting layer 144 is formed from the conducting material so the conducting layer is coupled to the insulating layer. The coupling between the conducting layer and the insulating layer can be facilitated via the adhesion layer 201. Next, at step 230, a portion of the supporting layer is removed to form a plurality of segments 74 and 162 and/or one or more buss(es) 70, 72, and 146-160. If the one or more buss(es) is only one buss, then the one buss is coupled to one or more of the plurality of segments. Conversely, if the one or more buss(es) includes two busses, then the two busses are coupled to less than all of the plurality of segments. The method ends at step 232.

Advantageously, embodiments 56, 84, and 86 of the present invention include low-stiffness gimbals that are appropriate for use with small sliders 12. By coupling the segments 74 and 162 that support the insulating layer 90 and 142 to only one buss 70 and 72, or, in the embodiments of the gimbals that include struts 120-126 having two busses 146-160, by connecting only a subset of the total number of segments to each of the busses, embodiments of the present invention offer less stiffness, and thus, a more desirable gimbal. Also, embodiments of the present invention include gimbals having ground planes in the form of the segments that advantageously help to reduce the characteristic impedance and insertion loss of the gimbals. In addition, embodiments of the gimbals according to the present invention can be manufactured using currently available fabrication techniques.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

We claim:

1. A gimbal that is configured to be coupled to a slider having a disk drive read-write transducer, the gimbal comprising one or more strut(s) having:
   a. an insulating layer that includes a first surface; and
   b. a supporting layer that includes at least one bus, the bus being laterally spaced away from the insulating layer, and a plurality of segments that is coupled to the insulating layer's first surface;
   c. wherein the at least one bus and the segments comprise a material that conducts electricity;
   d. and wherein the at least one bus comprises a structure selected from the group consisting of:
      i. a single bus coupled to one or more of the plurality of segments, and
      ii. two busses coupled to less than all of the plurality of segments.

2. The gimbal according to claim 1, wherein:
   a. the gimbal has a longitudinal axis; and
   b. the one or more strut(s) includes:
      i. a first strut that is located on one side of the gimbal's longitudinal axis, and
      ii. a second strut that is located on the other side of the gimbal's longitudinal axis,
      iii. wherein both the first strut and the second strut include the insulating layer and the supporting layer of claim 1.

3. The gimbal according to claim 1, wherein the insulating layer has a second surface, and further comprising a conducting layer that:
   a. is coupled to the insulating layer's second surface; and
   b. is configured to be coupled electrically to the disk drive read-write transducer.

4. The gimbal according to claim 3, wherein:
   a. the insulating layer has a height that ranges in value from approximately 5 µm to approximately 20 µm;
   b. the supporting layer has a height that ranges in value from approximately 15 µm to approximately 25 µm; and
   c. the conducting layer has a height that ranges in value from approximately 5 µm to approximately 20 µm.

5. The gimbal according to claim 1, wherein:
   a. the gimbal has a roll stiffness that ranges in value from approximately 0.55 µNm/deg to approximately 0.83 µNm/deg; and
   b. the gimbal has a pitch stiffness that ranges in value from approximately 0.54 µNm/deg to approximately 0.82 µNm/deg.

6. The gimbal according to claim 1, wherein the at least one bus has a width that ranges in value from approximately 50 µm to approximately 200 µm.

7. The gimbal according to claim 1, wherein each of the plurality of segments has a shape that is selected from the group consisting of rectangular, square, circular, elliptical, and hatched.

8. The gimbal according to claim 1, wherein the gimbal has a value selected from the group consisting of a characteristic impedance and an insertion loss that is lower than if the supporting layer did not include the plurality of segments.

9. The gimbal according to claim 1, wherein:
   a. the at least one bus is only a single bus; and
   b. the single bus is coupled to all of the plurality of segments.

10. The gimbal according to claim 1, wherein:
    a. the at least one bus includes a first buss and a second buss;
    b. the plurality of segments is located between the first bus and the second bus;
    c. the first bus is coupled to one or more of the plurality of segments; and
    d. the second bus is coupled to a different one or more of the plurality of segments.

11. In combination, the gimbal according to claim 1, a load beam on which the gimbal is mounted, and a magnetic disk drive.

12. A disk drive suspension that is configured to support a slider having a read-write transducer, the disk drive suspension comprising:
    a. a load beam; and
    b. a gimbal that:
       i. is coupled to the load beam,
       ii. is configured to couple to the slider, and
       iii. includes one or more strut(s) having:
          A. an insulating layer that includes a first surface, and
          B. a supporting layer that includes at least one bus, the bus being laterally spaced away from the insulating layer, and a plurality of longitudinally discontinuous segments that is coupled to the insulating layer's first surface, the at least one bus and the segments comprising a material that conducts electricity;
          C. wherein the at least one bus comprises a structure selected from the group consisting of:
             1. a single bus coupled to one or more of the plurality of segments, and
             2. two busses coupled to less than all of the plurality of segments.

13. The disk drive suspension according to claim 12, wherein:
   a. the gimbal has a roll stiffness that ranges in value from approximately 0.55 μNm/deg to approximately 0.83 μNM/deg; and
   b. the gimbal has a pitch stiffness that ranges in value from approximately 0.54 μNm/deg to approximately 0.82 μNm/deg.

14. The disk drive suspension according to claim 12, wherein:
   a. the at least one bus is only a single bus; and
   b. the single bus is coupled to all of the plurality of segments.

15. The disk drive suspension according to claim 12, wherein:
   a. the at least one bus includes a first bus and a second bus;
   b. the plurality of segments is located between the first bus and the second bus;
   c. the first bus is directly connected to a first subset of the plurality of segments; and
   d. the second bus is directly coupled to a second and different subset of the plurality of segments.

* * * * *